US008906129B2

(12) United States Patent
Sato et al.

(10) Patent No.: US 8,906,129 B2
(45) Date of Patent: Dec. 9, 2014

(54) COPPER ALLOY FOR SLIDING MATERIALS

(75) Inventors: Tomohiro Sato, Osaka (JP); Yoshimasa Hirai, Osaka (JP); Toru Maruyama, Suita (JP); Takeshi Kobayashi, Settsu (JP)

(73) Assignee: Kurimoto, Ltd., Osaka (JP)

( * ) Notice: Subject to any disclaimer, the term of this patent is extended or adjusted under 35 U.S.C. 154(b) by 4 days.

(21) Appl. No.: 13/641,880

(22) PCT Filed: Apr. 20, 2011

(86) PCT No.: PCT/JP2011/059713
§ 371 (c)(1),
(2), (4) Date: Oct. 18, 2012

(87) PCT Pub. No.: WO2011/132703
PCT Pub. Date: Oct. 27, 2011

(65) Prior Publication Data
US 2013/0036865 A1   Feb. 14, 2013

(30) Foreign Application Priority Data
Apr. 23, 2010 (JP) ................. 2010-099917

(51) Int. Cl.
| C22C 29/00 | (2006.01) |
| C22C 32/00 | (2006.01) |
| C22C 1/04 | (2006.01) |
| C22C 9/02 | (2006.01) |
| B22F 7/02 | (2006.01) |
| B22F 7/08 | (2006.01) |
| B22F 9/08 | (2006.01) |
| C22C 9/00 | (2006.01) |
| C22C 9/10 | (2006.01) |

(52) U.S. Cl.
CPC ............ *C22C 1/0425* (2013.01); *C22C 32/0089* (2013.01); *C22C 9/02* (2013.01); *C22C 9/00* (2013.01); *B22F 7/02* (2013.01); *B22F 7/08* (2013.01); *F16C 2220/20* (2013.01); *F16C 2204/12* (2013.01); *B22F 9/082* (2013.01)
USPC ............................ 75/230; 420/473; 420/490

(58) Field of Classification Search
CPC ..... C22C 1/0425; C22C 32/0089; B22F 7/08; F16C 2204/10
USPC ..................................... 75/230; 420/473, 490
See application file for complete search history.

(56) References Cited

U.S. PATENT DOCUMENTS

2004/0191110 A1* 9/2004 Nakanishi et al. ............ 420/122

FOREIGN PATENT DOCUMENTS

| DE | 1558707 | * | 4/1970 | ................ C22C 9/00 |
| JP | 2001-131660 | | 5/2001 | |

(Continued)

OTHER PUBLICATIONS

International Search Report issued Aug. 2, 2011 in International (PCT) Application No. PCT/JP2011/059713.
Written Opinion of the International Searching Authority, issued May 24, 2011, in International (PCT) Application No. PCT/JP2011/059713 (with English translation).
Chinese Office Action issued Sep. 25, 2014 in corresponding Chinese Patent Application No. 201180018416.0.

(Continued)

*Primary Examiner* — Keith Walker
*Assistant Examiner* — Alexander Polyansky
(74) *Attorney, Agent, or Firm* — Wenderoth, Lind & Ponack, L.L.P.

(57) ABSTRACT

A copper alloy having excellent sliding performance is produced without relying on lead or molybdenum. The copper alloy contains a sintered $Cu_5FeS_4$ material produced by sintering a raw material powder that comprises Cu, Fe and S and is produced by a gas atomizing method.

10 Claims, 5 Drawing Sheets

(56) References Cited

FOREIGN PATENT DOCUMENTS

| | | |
|---|---|---|
| JP | 2003-073758 | 3/2003 |
| JP | 2005-220385 | 8/2005 |
| JP | 2009-132986 | 6/2009 |

OTHER PUBLICATIONS

P. Castello, et al., "The Sulfidation of Two-Phase Fe-Cu Alloys in $H_2$-$H_2S$ Mixtures at 500-700°C", Oxidation of Metals, vol. 52, Nos. 5/6, 1999, pp. 403-426.

* cited by examiner

COPPER ALLOY FOR SLIDING MATERIALS

TECHNICAL FIELD

The present invention relates to a copper alloy which can be used for a sliding member such as a bearing material and which contains a non-lead component that contributes to sliding performance as a component that contributes to sliding performance.

BACKGROUND ART

Lead-containing copper alloys such as, typically, CAC603 (a Cu—Sn—Pb-based copper alloy) have been used for sliding members including a bearing material. In all of the lead-containing copper alloys, lead contributes to sliding performance. However, for fulfilling such a social demand that the amount of lead to be used should be reduced, various types of copper alloys for sliding materials each of which uses a reduced amount of lead have been studied.

For example, Patent document 1 discloses a sliding member produced using Cu which may be partly substituted by Sn or Zn as a matrix material and an alloy composed of any one of Fe, Ni and Co, and Mo and S as a low-friction alloy and by performing sintering of these materials. In the sliding member, an $MoS_2$ phase contributes to a reduction in frictional coefficient and the inhibition of the generation of $MoS_2$ by iron sulfide can be prevented by substituting a part of Fe by Mi or Co.

PRIOR ART DOCUMENT

Patent Document

Patent document 1: JP Patent publication 2003-73758A

SUMMARY OF THE INVENTION

Object of the Invention

However, in a copper alloy which contains $MoS_2$ as the main sliding material (Patent document 1), $MoS_2$ is often oxidized and deteriorated in the sintering step for producing $MoS_2$ as well as during use, and therefore there is a problem that the deterioration in lubricating performance cannot be prevented merely by preventing the oxidation during the sintering step.

Therefore, the object of the present invention is to produce a copper alloy which can exhibit effective sliding properties without relying on the use of $MoS_2$, which may be oxidized.

Means to Achieve the Object

The present invention solves the above-mentioned problem by providing a copper alloy for sliding materials which comprises $Cu_5FeS_4$. The copper alloy comprising $Cu_5FeS_4$ exhibits high sliding performance.

With respect to the method for producing the copper alloy comprising $Cu_5FeS_4$, when a raw material powder comprising Cu, S and Fe is produced by, for example, an atomizing method, a copper alloy comprising $Cu_5FeS_4$ can be produced. It is considered that this occurs as the result of the rapid cooling by the atomizing method. Therefore, the method for producing the copper alloy is not particularly limited as long as the same conditions can be achieved.

Advantages of the Invention

The copper alloy according to the present invention can solve the problems in the conventional copper alloys for sliding materials, because $Cu_5FeS_4$ contained in the copper alloy exhibits sliding performance.

In the copper alloy, $Cu_5FeS_4$ can still exist after the sintering of the copper alloy. Therefore, the copper alloy can be used for the production of a laminated sintered member having a layer capable of exhibiting sliding performance formed on the surface thereof, by spraying particle powder of the copper alloy which is produced by a gas atomizing method onto a back metal of a metal fitting to be used in a bearing and then sintering and rolling the sprayed material.

BRIEF DESCRIPTION OF THE INVENTION

BEST MODE FOR EMBODYING THE INVENTION

Figure 1:
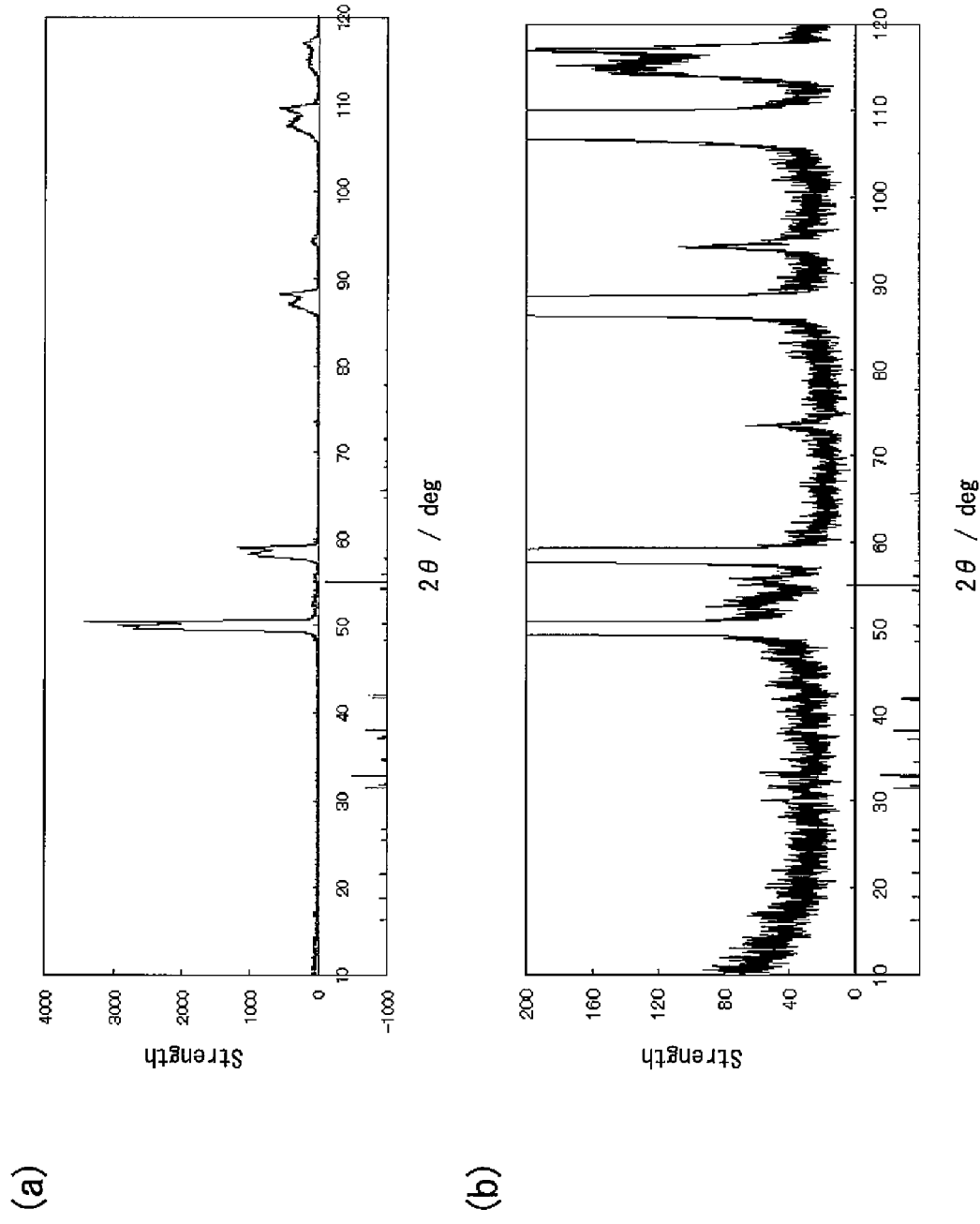
FIG. 1 is an X-ray diffraction graph of a raw material powder produced in Example 1 which is not sintered yet.

The present invention is described in detail below. The present invention relates to a copper alloy for sliding materials which contains $Cu_5FeS_4$. $Cu_5FeS_4$ is generated in the copper alloy by melt-mixing a raw material containing Cu, Fe and S and then rapidly cooling the melt-mixed product by a gas atomizing method, a water atomizing method or the like. The term "copper alloy" as used herein means an alloy containing copper in an amount of 50 mass % or more.

The copper alloy may additionally contain an element other than Cu, Fe or S. For example, the copper alloy may be a bronze-type copper alloy containing Sn in an amount of 1 mass % or more and 15 mass % or less. When components for providing such a bronze-type copper alloy are fired, the resultant alloy can have high strength. Therefore, such a bronze-type copper alloy is preferred.

Further, for the purpose of achieving a deoxidation effect, it is also possible to add P in a molten stage before performing rapid cooling.

The smaller the content of Pb in the sintered copper alloy, the better. A large content of Pb is not preferred, from the viewpoint of environmental load.

The raw material containing the above-mentioned elements and used in the production of a melt that is to be subjected to rapid cooling may e.g. be element Cu, element Sn, iron sulfide, Cu—Fe or CuP.

After mixing these materials to be dissolved in each other, the resultant melt is rapidly cooled, thereby generating a copper alloy material or a copper alloy each containing $Cu_5FeS_4$. The rapid cooling method to be employed is preferably an atomizing method, because, with this method, cooling can be achieved rapidly and uniform particles can be produced readily. A gas atomizing method may also be employed, because, with this method, particles that can serve as a raw material of a uniform and good copper alloy can be produced. When the copper alloy particles are produced by a gas atomizing method, the melt is allowed to flow through a nozzle hole that is provided at the bottom of a container in which the melt has been charged, and an inert gas is sprayed in the form of jets against the direction of the flow. The reason why an inert gas is used is because the oxidation of the raw material can be prevented. Specifically, nitrogen, argon or the like can be used.

Although the temperature of the inert gas is not specifically limited, it is required to perform the rapid cooling with a sufficient temperature difference between the inert gas and the melt. Specifically, the cooling rate should be about $10^3$ K/sec or more.

The flow of the melt is finely divided and rapidly cooled by the inert gas, which is sprayed in the form of jets, thereby producing fine powder. Because the formation of droplets and the cooling are achieved simultaneously, particles that have almost spherical shapes and are homogeneous can be produced. A compound $Cu_5FeS_4$ is formed in the alloy during the rapid cooling.

The particle diameters of the raw material powder produced by the gas atomizing method are preferably 150 μm or less. If the particle diameters are too large, the production of the sliding material might not be performed efficiently.

The raw material powder thus produced is sintered, thereby producing a copper alloy that is suitable as the sliding material. For example, the sintering is achieved by spraying the powder onto a material on which a sliding layer is to be formed and then heating the sprayed product at a temperature at which the sintering is to be performed. If firing is performed after the spraying, after primary sintering and rolling, the sliding material may be subjected to secondary sintering and then to rolling again. By performing the secondary sintering and the second-time rolling, a sliding layer that is integrated with the base material more strongly compared with a sliding layer that is produced only by primary sintering can be produced. In this case, it may be possible to mix another alloy powder such as a copper alloy powder with the powder that is not sintered yet and then perform the sintering of the resultant mixture.

The temperature to be employed for the sintering of the raw material powder is preferably 800° C. or more and 900° C. or less. It is particularly preferred to sinter the raw material at a temperature of 830° C. or more and 860° C. or less for 5 to 60 minutes. If the temperature is too low or too high, or the time is too short or too long, mechanical properties suitable as a sliding material might not be achieved. The sintering is preferably performed in a reducing atmosphere, because the powder might otherwise be oxidized. The sintering furnace to be employed may be a batch furnace or a continuous furnace.

The copper alloy for sliding materials according to the present invention contains $Cu_5FeS_4$ preferably in an amount of 1 mass % or more so that desired sliding performance can be exerted, and more preferably in an amount of 2 mass % or more so that sufficient sliding performance can be secured. On the other hand, it is difficult to allow $Cu_5FeS_4$ to be contained in an amount larger than 20 mass %, because other phase may be generated. The copper alloy containing $Cu_5FeS_4$ in an amount of 15 mass % or less is practically useful and is therefore preferred as a copper alloy for sliding materials.

EXAMPLES

The present invention is described below with reference to specific examples as a bronze-type copper alloy. First, the raw materials to be used are described.

Examples 1 and 2

Element Cu, element Sn, iron sulfide, Cu—Fe and CuP were mixed together, and the mixture was placed in a crucible and then heated in a nitrogen atmosphere to melt the mixture, thereby producing a melt.

The melt was allowed to flow, and a nitrogen gas having ambient temperature was ejected through a nozzle that was arranged on the flow passage, thereby rapidly cooling the melt at a cooling rate of about $10^3$ K/s. In this manner, particles were produced. A powdery portion of the particles which had particle diameters of 150 μm or less was used in the below-mentioned tests.

With respect to the desired element ratio in the products produced by an atomizing method in Examples, the following element ratio is desired in Example 1: 9.0 to 11.0 mass % of Sn, 1.5 to 2.5 mass % of Fe, 0.5 to 0.7 mass % of S, and 0.01 to 0.03 mass % of P, with the remainder being Cu and unavoidable impurities. In Example 2, the following element ratio is desired: 9.0 to 11.0 mass % of Sn, 1.5 to 2.5 mass % of Fe, 1.8 to 2.2 mass % of S, and 0.01 to 0.03 mass % of P, with the remainder being Cu and unavoidable impurities.

<X-Ray Diffraction Test>

Figure 2:
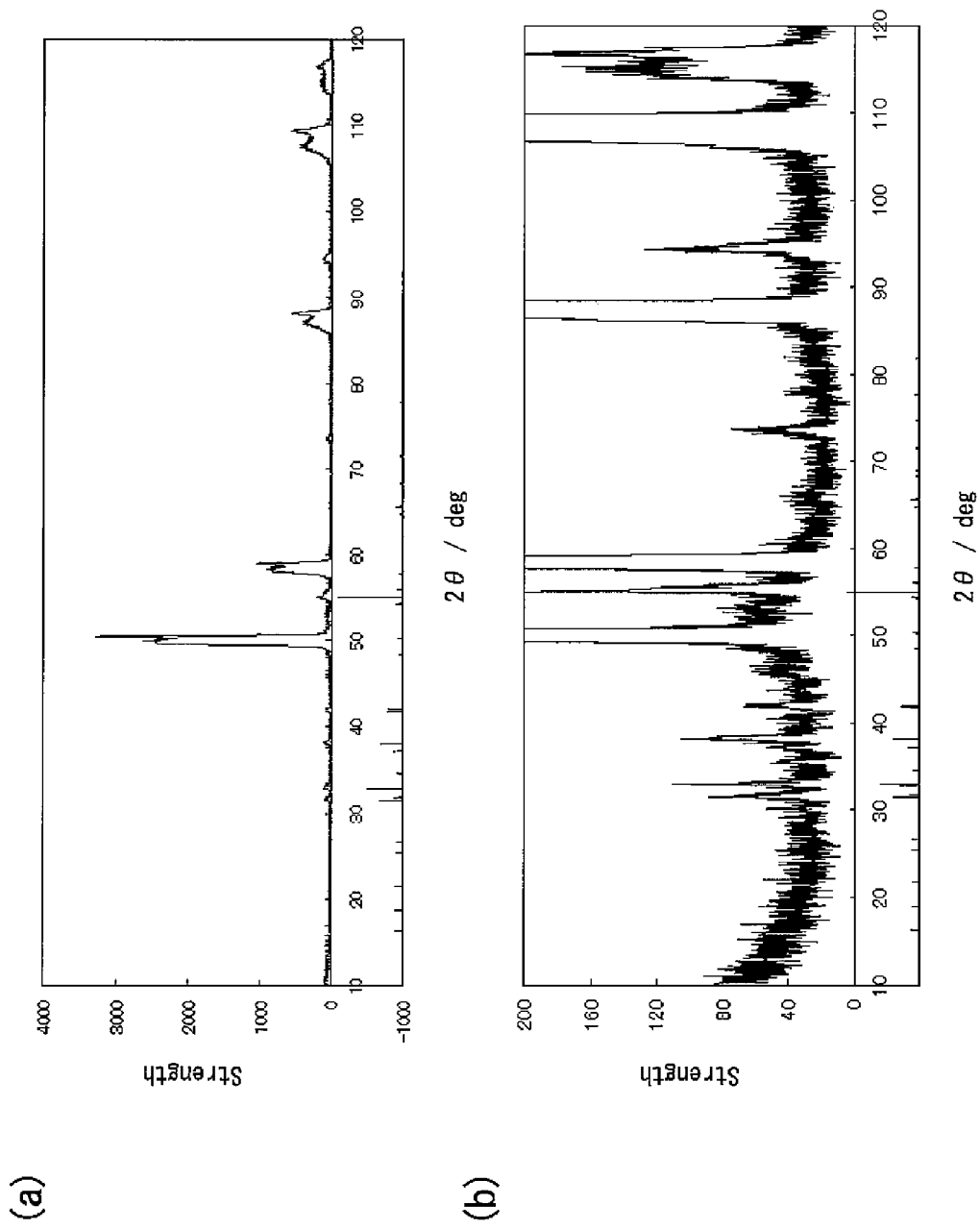
FIG. 2 is an X-ray diffraction graph of a raw material powder produced in Example 2 which is not sintered yet.

Each of the particle powder thus produced was analyzed by a powder X-ray diffraction method. As for the device employed for the test, an X-ray diffraction device (XRD, Rigaku Cooperation, RINT-2500H/PC) was used. The X-ray source was CoKα (30 kV-100 mA), and the analysis was performed in a θ-2θ mode. The scan resolution was 0.02°, and a sample was rotated at 60 rpm so that the analysis could be performed at a scan rate of 2°/min. The results for Example 1 are shown in FIG. 1, and the results for Example 2 are shown in FIG. 2. In each figure, (a) is a full strength graph and (b) is an enlarged graph. In both of the graphs, peaks were observed at positions corresponding to the diffraction peaks (i.e., peaks shown in the lower part of each figure) for PDF (Powder Diffraction File (published by the International Centre for Diffraction Date-ICDD)) 42-1405, which is one embodiment of $Cu_5FeS_4$, and it was confirmed that $Cu_5FeS_4$ was generated by the rapid cooling of the melt. Any other sulfide or element sulfur was not detected. From these results, it is considered that almost all of sulfur was involved in the formation of $Cu_5FeS_4$ in Examples 1 and 2.

Figure 3:
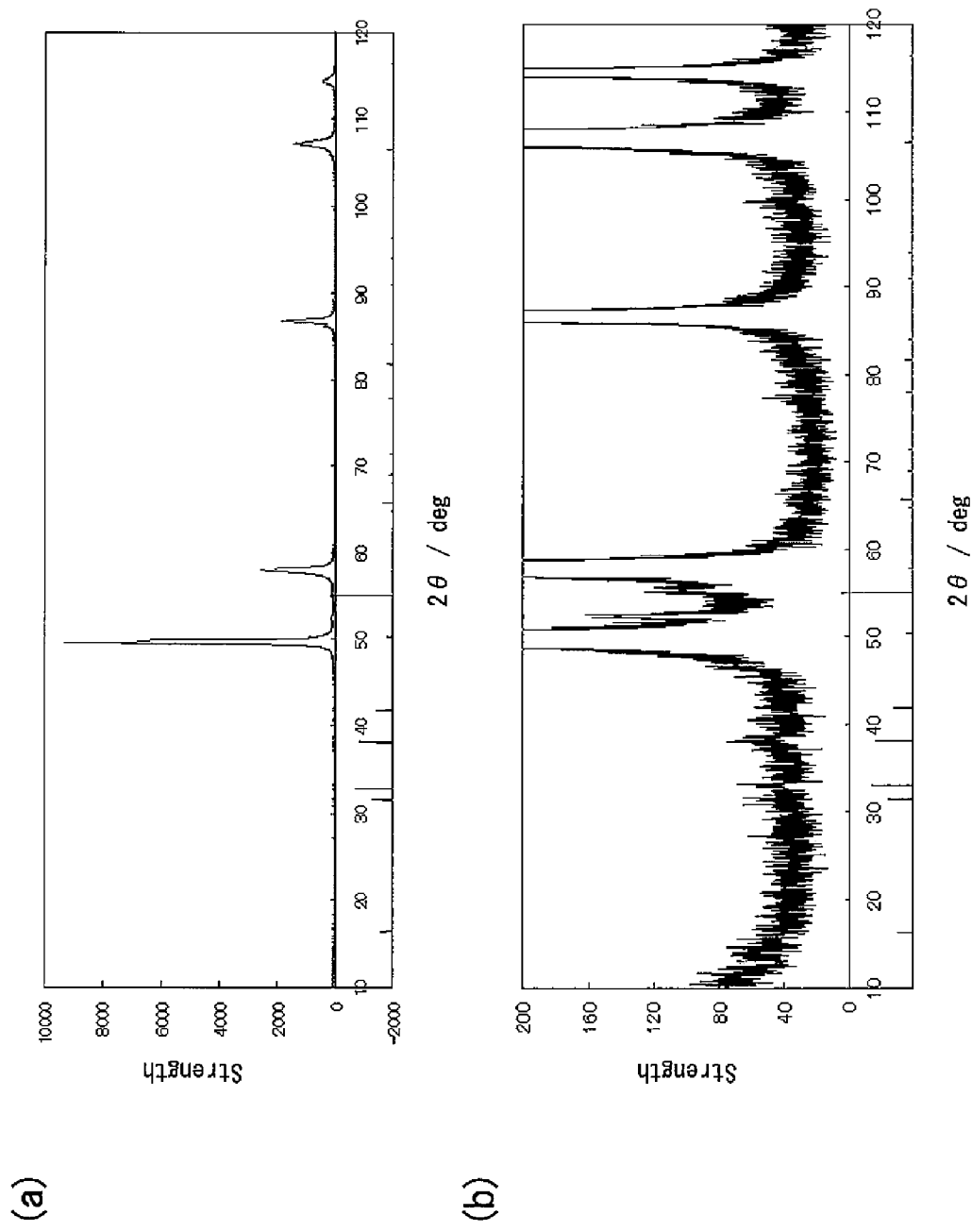
FIG. 3 is an X-ray diffraction graph of a sintered raw material powder produced in Example 1.
Figure 4:
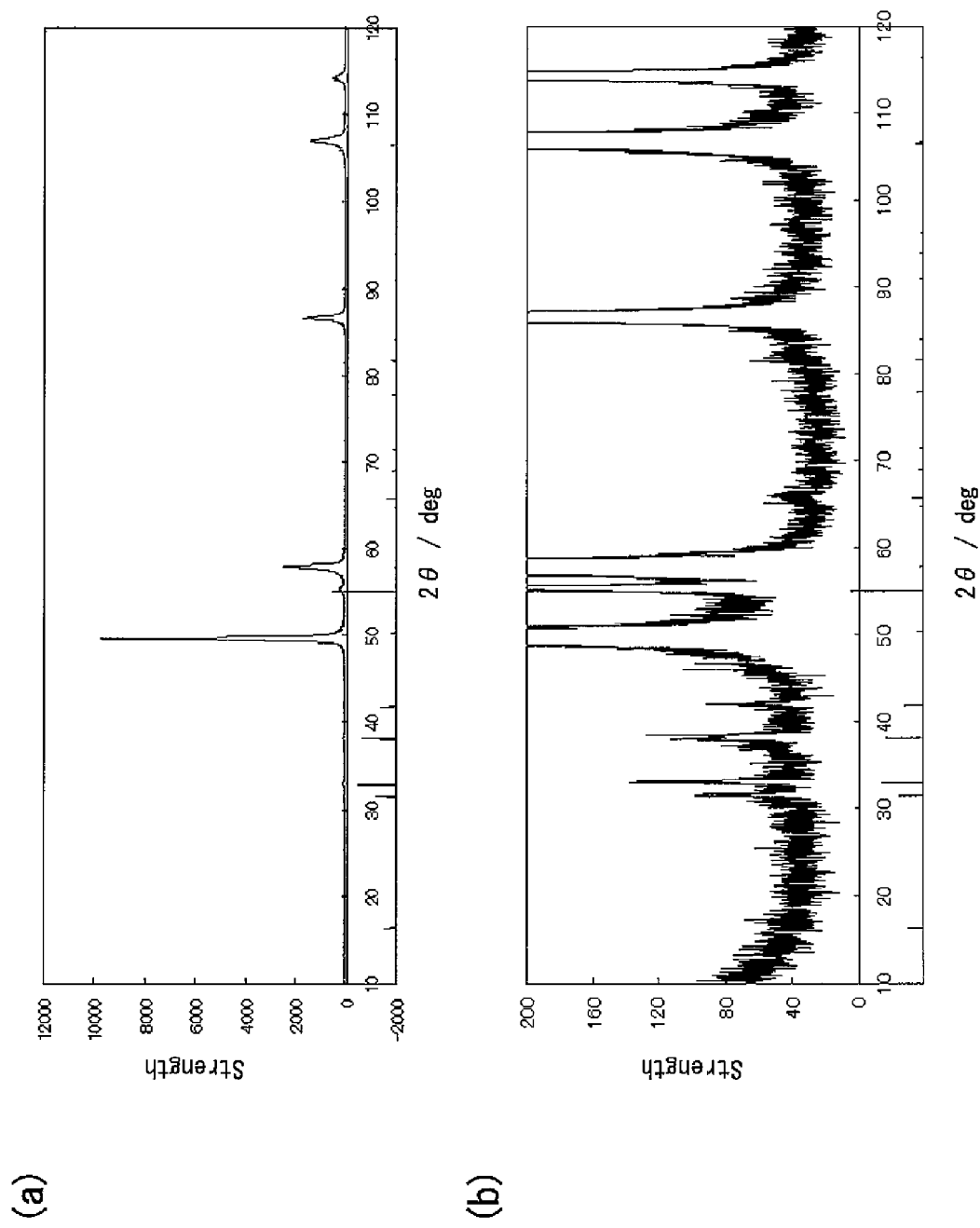
FIG. 4 is an X-ray diffraction graph of a sintered raw material powder produced in Example 2.

A mixture of each of the particle powders and a Cu(80)-Sn (20) alloy powder was sprayed onto a 3.2 mm-thick back metal (an SPC steel sheet; 100 mm×28 mm) in a thickness of 2.5 mm, and the resultant product was subjected to a primary sintering procedure by heating in a tubular furnace in a reducing atmosphere at a temperature ranging from 830 to 860° C. for 10 minutes. Subsequently, the sintered product was subjected to a primary rolling procedure using a roller, and then subjected to a secondary sintering procedure under the same conditions as those employed for the primary sintering procedure, thereby producing a sintered sample having a total thickness of about 90% of the unsintered form thereof (the thickness of the copper alloy layer: about 2 mm). The sintered sample was analyzed by a powder X-ray diffraction method in the same manner as mentioned above. The results for the sintered sample of Example 1 are shown in FIG. 3, and the results for the sintered sample of Example 2 are shown in FIG. 4. In both figures, clear peaks were observed at positions corresponding to diffraction peaks (i.e., peaks shown in the lower part of each figure) for PDF25-1424, which is one embodiment of $Cu_5FeS_4$. Any other sulfide or element sulfur was not detected. From these results, it is considered that almost all of sulfur was still involved in the formation of $Cu_5FeS_4$ after the sintering, although the structure of $Cu_5FeS_4$ was changed after the sintering.

<Component Analysis>

Each of the sintered test pieces produced in Examples 1 and 2 was subjected to a component analysis. In the analysis of the contents of the components, the analysis of the contents of Sn and Fe was performed by an ICP emission spectrophotometry, the analysis of the content of S was performed by a high-frequency combustion infrared absorption method, the analysis of the content of P was performed by a molybdovanadophosphoric acid absorption spectrophotometry, and the analysis of the content of Pb was performed by the ICP emission spectrophotometry. In the TOP emission spectrophotometry, IRIS Advantage RP CID detector (a product by Thermo Electron Co., Ltd.) was used as an ICP analysis device, and the calculation was performed with deeming the remainder as copper. The results are shown in Table 1. From the results of the component ratios, it is considered that 2.03 mass % of $Cu_5FeS_4$ was contained in the sintered test piece produced in Example 1 and 6.34 mass % of $Cu_5FeS_4$ was contained in the sintered test piece produced in Example 2, because it is considered that all of S was involved in the formation of $Cu_5FeS_4$ as mentioned above. With respect to Comparative Examples 1 and 2, desired values for the alloys are shown in Table 1.

Figure 7:
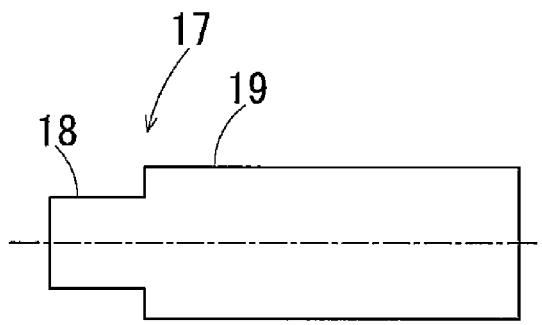
FIG. 7 shows the shape of a pin to be used in the friction and wear test.
Figure 8:
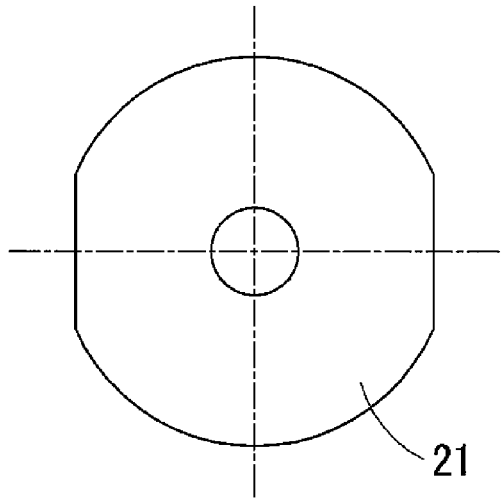
FIG. 8 shows the shape of a disk to be used in the friction and wear test.

With respect to the CAC603 sliding material of Comparative Example 1, a pin 17 having a shape as illustrated in FIG. 7 (in which a sliding side was step-processed in such a manner that a non-stepped part 19 had a size of φ8×25t and a stepped part 18 had a size of φ5×6t; the sliding surface had an Ra value of 3.2) was used as a test piece. As a disk to be slid with the pin, an S45C iron steel sample disk 21 having a shape as illustrated in FIG. 8, a size of φ55×5t and a test surface with an Ra value of 3.2 was used.

As for the test machine, a friction and wear test machine RI-S-500NP (Takachihoseiki Co., Ltd.) was used. The disk 21 and the chip test piece 22 in the test machine were immersed in an oil (Rimula D20W-20; Showa Shell Sekiyu K. K.) that had flowed at a flow rate of 200 ml/min, and the temperature of the test environment was kept at 80±5° C.

The test was performed by a step-by-step operation comprising performing a running-in operation for 3 minutes and subsequently increasing the load (average surface pressure) in 25 MPa steps at a disk circumferential velocity of 6.2 m/s, wherein each load was maintained for 2 minutes. The test was completed on the assumption that the time point at which oily smoke was generated during the test was the time point at which burning of the disk occurred. The average frictional coefficient at the individual loads and the maximum PV value (which is a product of the average surface pressure and the

TABLE 1

| Tests | Solid lubricant components | Cu | Sn | Fe | S | P | Pb | Average surface pressure MPa | Circumferential velocity m/s | Average frictional coefficient | Maximum PV value MPa · m/s | Average time s |
|---|---|---|---|---|---|---|---|---|---|---|---|---|
| | | | | Components (mass %) | | | | | | | | |
| Example 1 | $Cu_5FeS_4$ | 86 | 12 | 1.45 | 0.52 | 0.02 | — | 25.6 | 6.2 | 0.013 | — | 120 |
| | | | | | | | | 51.7 | | 0.089 | — | 120 |
| | | | | | | | | 77.6 | | 0.080 | 481.0 | 13 |
| Example 2 | | 85 | 12 | 1.37 | 1.62 | 0.02 | — | 25.6 | 6.2 | 0.041 | — | 120 |
| | | | | | | | | 51.7 | | 0.077 | — | 120 |
| | | | | | | | | 77.7 | | 0.061 | — | 120 |
| | | | | | | | | 103.9 | | 0.061 | 644.1 | 105 |
| Comparative Example 1 | Pb | 80 | 10 | — | — | 0 | 10 | 25.7 | 6.2 | 0.092 | — | 120 |
| | | | | | | | | 51.7 | | 0.073 | — | 120 |
| | | | | | | | | 77.7 | | 0.071 | 481.7 | 53 |
| Comparative Example 2 | — | 88 | 12 | — | — | — | — | 25.7 | 6.2 | 0.147 | — | 120 |
| | | | | | | | | 51.4 | | 0.125 | 318.7 | 8 |

<Friction and Wear Test>

Next, a test piece of each of the products of Examples 1 and 2, a material for Comparative Example 1 (i.e., CAC603 which is a conventional lead-containing alloy for sliding materials) and a material for Comparative Example 2 (i.e., a Cu—Sn alloy comprising 88 wt % of Cu and 12 wt % of Sn) was produced, and the test piece was subjected to a friction and wear test, thereby measuring a PV value.

First, the production of the test piece is explained. For each of Examples 1 and 2, a mixture of the particles produced by a gas atomizing method and a Cu(80)-Sn(20) alloy powder was used. For Comparative Example 2, a powder having the component ratio shown in Table 1 was used. A test piece was produced using each of the mixtures and the powder in the same manner as in the X-ray diffraction test.

Figure 5:
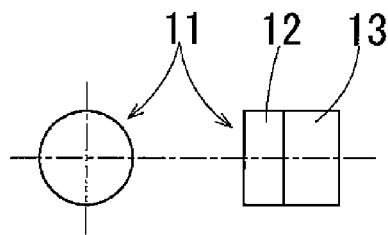
FIG. 5 shows the shape of a chip to be used in a friction and wear test.
Figure 6:
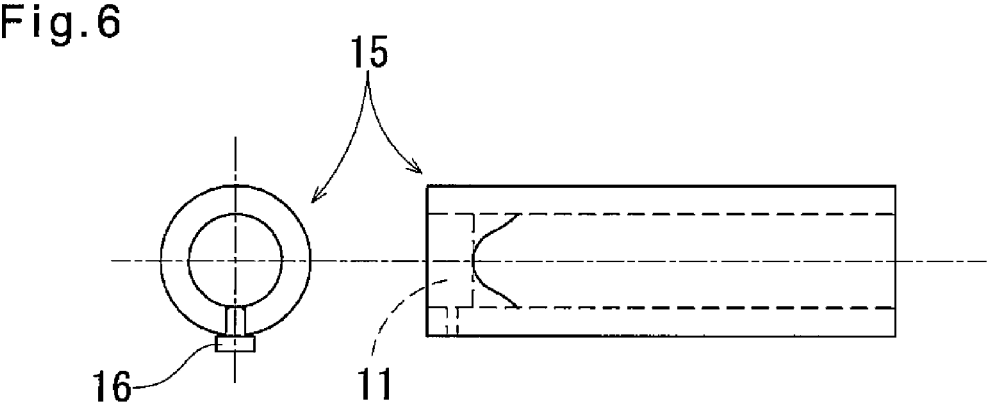
FIG. 6 shows the shape of a chip holder to be used in the friction and wear test.

Each of the sintered products produced in Examples 1 and 2 and Comparative Example 2 was processed into a bi-metal chip 11 having a shape as illustrated in FIG. 5, a size of φ5×4t and a sliding surface with an Ra value of 3.2. In the figure, the left side 12 is a copper alloy layer and the right side 13 is a back metal. The bi-metal chip 11 was fastened to a chip holder 5 having a shape as illustrated in FIG. 6 and an inner perimeter of φ5.0 by a setting bolt 16, thereby producing a test piece.

circumference velocity at a load at which the burning of the disk occurred) for each of the test pieces are shown in Table 1.

The products produced in Examples 1 and 2 have average frictional coefficients and PV values which are equivalent to or higher than those of the conventional lead-containing sliding material CAC603, and therefore it is confirmed that these products exhibit effective sliding properties. Comparison is made between the product produced in Example 1 and the product produced in Example 2, and it is found that the product produced in Example 2, which contained $Cu_5FeS_4$ in a larger amount, had a better average frictional coefficient and a better PV value. On the contrary, the material of Comparative Example 2, which did not contain $Cu_5FeS_4$, underwent burning immediately after the first-round increase in pressure, and did not exhibit sliding properties.

As other examples, the X-ray diffraction test was performed on a test piece that was produced in the same manner as described above using a particle powder produced by a water atomizing method and the powder that was not sintered yet. In both of the samples, peaks were observed clearly at positions corresponding to the diffraction peaks for $Cu_5FeS_4$ (PDF25-1424) and a peak for any other sulfide or element sulfur was not observed.

DESCRIPTION OF THE NUMERALS

11 Bi-metal chip
12 Copper alloy layer
13 Back metal
15 Chip holder
16 Setting bolt
17 Pin
18 Stepped part
19 Non-stepped part
21 Sample disk

What is claimed is:

1. A copper alloy for sliding materials,
   wherein the copper alloy comprises $Cu_5FeS_4$,
   wherein the copper alloy is produced by melt-mixing a raw material comprising Cu, Fe and S to obtain a melt-mixed product, and then rapidly cooling the melt-mixed product to generate the $Cu_5FeS_4$ in the copper alloy, and
   wherein the copper alloy has an X-ray powder diffraction pattern shown by FIG. 3 or FIG. 4.

2. The copper alloy of claim 1, wherein the copper alloy is a bronze alloy and further comprises 1 mass % or more and 15 mass % or less of Sn.

3. The copper alloy of claim 1, wherein the rapid cooling is produced by an atomizing method to obtain a raw material powder, and producing the copper alloy further comprises sintering the raw material powder.

4. A sliding material comprising the copper alloy of claim 1, wherein the copper alloy forms a sliding surface of the sliding material.

5. A sliding material comprising a base and the copper alloy of claim 3, wherein the copper alloy is provided on the base by spraying the raw material powder onto the base, and wherein the copper alloy is sintered together with the base.

6. The copper alloy of claim 2, wherein the rapid cooling is produced by an atomizing method to obtain a raw material powder, and producing the copper alloy further comprises sintering the raw material powder.

7. A sliding material comprising a base and the copper alloy of claim 6, wherein the copper alloy is provided on the base by spraying the raw material powder onto the base, and wherein the copper alloy is sintered together with the base.

8. A sliding material comprising the copper alloy of claim 2, wherein the copper alloy forms a sliding surface of the sliding material.

9. A sliding material comprising the copper alloy of claim 3, wherein the copper alloy forms a sliding surface of the sliding material.

10. A sliding material comprising the copper alloy of claim 6, wherein the copper alloy forms a sliding surface of the sliding material.

* * * * *